United States Patent Office 3,052,876
Patented Sept. 4, 1962

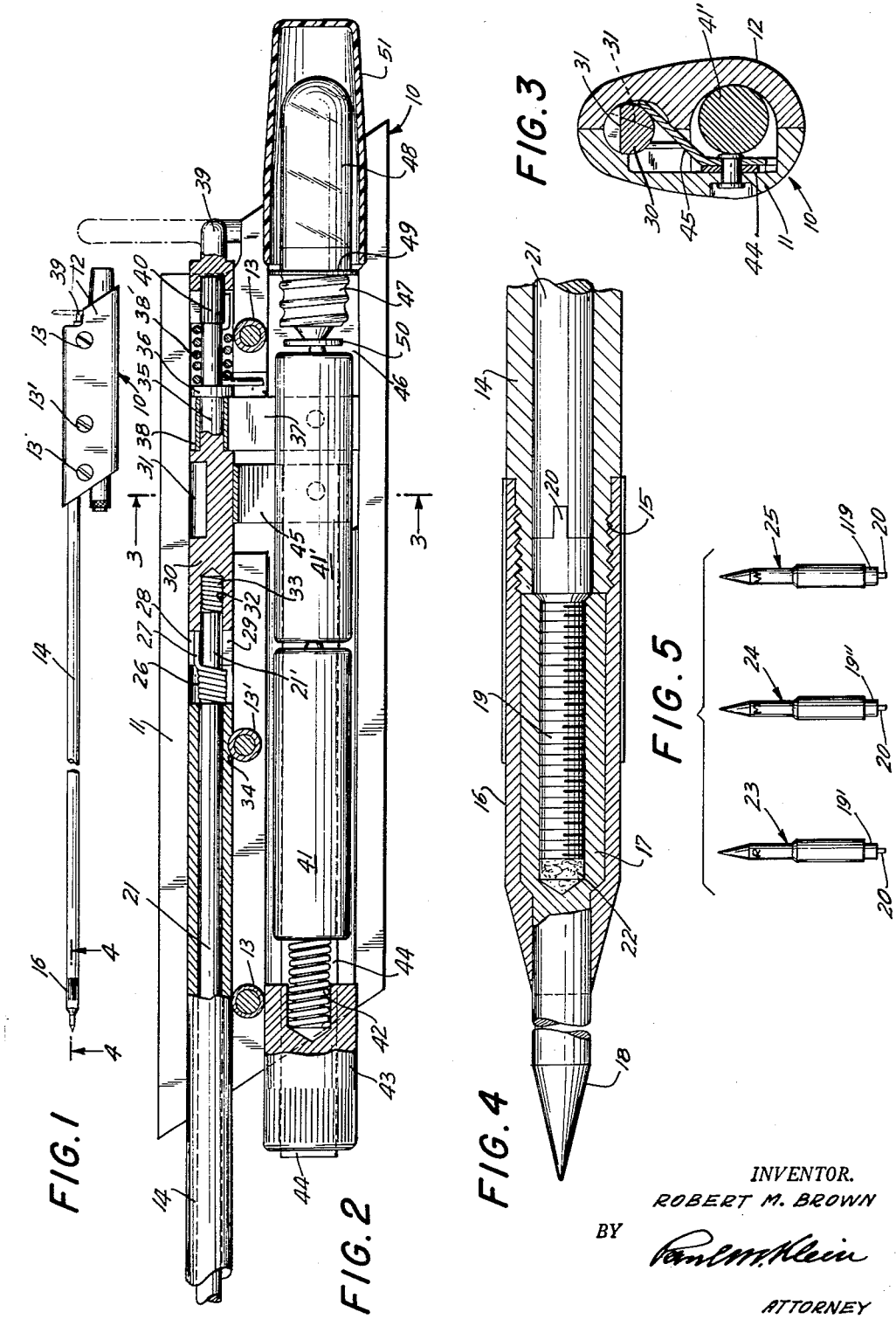

3,052,876
INDICATING DEVICE FOR MEAT TREATMENT
Robert M. Brown, P.O. Box 35, Coral Gables, Fla.
Filed Oct. 8, 1959, Ser. No. 845,130
13 Claims. (Cl. 340—227)

This invention relates broadly to an indicating device especially adapted to indicate a desired state of readiness of meat subjected to heat treatment.

The prime object of the present invention is to provide a rather simple, inexpensive, but effective device for indicating to what extent meat has been treated at a desired state of readiness.

Another important object of the present invention is the provision of an electrically operated indicating device showing that meat being treated has reached a desired state of readiness and wherein an electrically operated annunciator, in any suitable form, such as a flashing light, will indicate when a meat subjected to a heat treatment has attained the desired state of readiness.

The foregoing and numerous other important objects and other advantages of the present invention will become more fully elucidated by the following description in conjunction with the accompanying drawings, wherein:

FIG. 1 is a plan view of a presently preferred form of the device;

FIG. 2 is an enlarged plan view of the handle portion of the device with the top half of the handle removed;

FIG. 3 is a section taken approximately along line 3—3 of FIG. 2, including the upper half of the handle;

FIG. 4 is an enlarged section taken along line 4—4 of FIG. 1; and

FIG. 5 illustrates three heat responsive meat piercing tips or implements with markings to indicate desired degrees of readiness of treated meat.

In the drawings numeral 10 denotes the handle of the device. This handle is composed of two parts, that is bottom part 11 shown in FIG. 2 and upper or cover part 12 seen in plan view in FIG. 1. These two handle parts are held together by screws 13 and 13'. Extending from the handle is a tubular meat penetrating member 14, the outer end of which is threaded as at 15 (FIG. 4). To that threaded end is removably attached a hollow tip holder 16 in which is immovably lodged a hollow meat piercing implement 17 terminating at 18 in a sharp tip adapted to be forced into the body of meat.

Within hollow implement 17 is housed a rotary element or core 19 provided with a connecting end 20 adapted to removably engage a torsion rod 21 operable within tubular member 14. Rotary element 19 is normally fixedly held within piercing implement 17 by a heat-responsive alloy compound 22, which latter is adapted to melt at a desired temperature to release rotary element or core 19 for turning. This alloy 22 filling the interior of piercing element 17 is a specially designed metallic compound. Within the piercing implement or tip shown at left in FIG. 5 and indicated at 23, an alloy is employed which melts or liquefies at say 125 degrees F. In piercing implement or tip 24 there is used a compound or alloy which melts or liquefies at say 140 degrees, and in piercing implement or tip 25 a compound or alloy is used which melts say at 165 degrees. All of the piercing implements or tips shown in FIG. 5 are provided with rotary elements or cores 19', 19" and 119, respectively; each of which core is provided with a connecting end 20 for engaging the aforesaid torsion rod 21.

Referring to FIG. 2 it will be seen that the interior end of torsion rod 21 is frictionally engaged by a torsion or clutch spring 26, the straight end 27 of which extends into either of the two recesses 28 or 29 arranged at the left end of a rotary switch member 30, the latter being provided with a cut-out or notch 31. It will be noted that the left-hand end of rotary member 30 is provided with a socket 32 for receiving a spring 33 against which bears the reduced end 21' of torsion rod 21 and about which reduced end torsion spring 26 is wound. Spring 33 is intented to urge torsion rod 21 and thus core 19 and element 17 into the socket formed in holder 16. It will be noted that handle screw 13' engages a recess 34 provided in tubular member 14, see FIG. 2. This recess, which is engaged by the body of screw 13', prevents tubular member 14 from turning within and disengagement from the handle.

The right hand end of rotary switch member 30 is reduced as at 35 and there is provided at the reduced end a flange 36. Between the flange and the larger portion of switch member 30 is arranged a clip 37 which is formed into a bearing 38 for the rotary switch member. At the right of flange 36 there is wound what may be termed a main or cocking spring 38' which is operated by means of a lever 39 extending outwardly from the handle and being connected to the knurled reduced end 40 of the switch member. Disposed in suitable recesses within the handle are two series-connected batteries 41 and 41' against which batteries presses a spring 42 lodged in a metallic end button 43. Beneath that button and engaging its end is a connecting strip 44 which passes beneath the insulated batteries and terminates in a contact clip 45, which is adapted to be aligned with recess 31 of rotary switch member 30. Clip 37, from which the bearing 38 for rotary switch member 30 is formed, is connected by means of a strip 46 to the base 47 of bulb 48. Strip 46 forms a yoke 49 which engages the base of the bulb. Between the bulb and battery 41' will be seen a contact disc 50 which is intended to enlarge the contact area for the bulb. Bulb 48 is provided with a flasher and is preferably encased within a translucent cover 51 which is set into the end of handle 10.

Referring now to FIG. 3, when rotary switch member 30 is in the position shown in full line, contact clip 45 engages the outer surface thereof and effects a connection through that clip, through strip 44 to the left end of battery 41. In so doing, current is caused to pass from the batteries to disc 50 and thus to the center of bulb 48, which latter is caused to light up. When switch member 30 is turned so that its recess 31 assumes the position shown in broken lines in FIG. 3, contact clip 45 no longer engages rotary switch member 30 and therefore current cannot pass to the bulb.

*Operation*

When a steak or a roast is to be prepared to a certain degree of readiness, for instance when the steak is to be rare, the tip 23 (FIG. 5) is inserted in holder 16 and is tightened in place. Tip 23 is then caused to penetrate substantially centrally between the two outer surfaces of the steak so that tubular member 14 becomes centrally lodged therein, but holder 16 and tip 23 remain imbedded in the meat. Now the steak is subjected to heat alternately at its outer surfaces.

Prior to placing the present device into the steak, it is essential to first render the same operative at the temperature at which the steak is to be ready. To do so lever 39 is turned in counterclockwise direction to its stop position, against the force of main spring 38'. That movement will cause contact clip 45 to momentarily engage switch member 30, thereby causing test bulb 48 to light up. When the lever is released, the latter is urged in clockwise direction by the main spring, thus breaking the electric contact. That movement of member 30 is stopped by clutch spring 26, which, when lever 39 has moved in clockwise direction, frictionally engages reduced portion 21' of torsion rod 21.

It is to be noted that a counterclockwise movement of lever 39 will cause clutch spring 26 to slip upon reduced portion 21' of the torsion rod, and that lever 39 must never be turned by hand in clockwise direction, since such forcible movement will deform the clutch spring.

Having inserted the device through the steak and subjected the steak to heat, when the temperature of the steak reaches say 125 degrees, alloy compound 22 within implement 17 melts and permits core 19 to turn due to the tension of clutch spring 26, thereby causing rotary switch member 30 to turn clockwise to a position shown in full line in FIG. 3. At that position contact strip 45 establishes contact between the batteries and the bulb and the bulb lights up, the flasher periodically interrupting the current flowing to the bulb, thus advising the user that the steak is done "rare." This movement of the switch member 30 causes lever 39 to turn in clockwise direction. Irrespective of the movement imparted to the lever by clutch spring 26, when the lever is turned by hand in counterclockwise direction, as stated above, it will cause switch member or shaft 30 to make contact with strip 45, whereby current is supplied to the bulb. Thus the operativeness of both the bulb and of the battery can be tested.

It is evident that after the device has been used in connection with the conditioning of a piece of meat and the fusible alloy in the tip has cooled and hardened, it would be impossible to turn off the light without the use and operation of clutch spring 26, which latter will slip upon torque rod 21 when lever 39 is turned by hand in counterclockwise direction.

By mounting either of the three tips marked "R" for "rare," "M" for "medium" and "W" for "well done," shown in FIG. 5, in holder 16, the meat treated will acquire the indicated state of readiness, and when such readiness is reached, bulb 48 will flash.

From the foregoing description in conjunction with the drawing, an indicator in the form of a flashing bulb is dealt with. Obviously any other alarm or other type of electric annunciator can be substituted for the bulb. Thus, for instance, a sound-producing alarm may also be used effectively.

While in the foregoing specific features in the device are described, variations and changes in its construction may be required in the course of producing the device in quantities, for which reason such structural changes or modifications are deemed to reside within the broad scope of the present invention as defined in the annexed claims.

What is claimed as new is:

1. In an indicating device for signalling the desired state of readiness of meat being treated, a tubular meat penetrating member, a handle at one end of the member, a heat-responsive hollow piercing tip removably associated with the other end of said tubular member, a torsion rod operative within said tubular member and connected at one end with and held against rotation by said piercing tip, a rotary electric switch, a battery and a bulb with a flasher mounted in said handle, a clutch spring frictionally engaging the other end of said torsion rod and bearing against said switch, a cocking spring engaging said switch, a lever for cocking said cocking spring extending from the handle, said cocking spring, when cocked, keeping said switch in open position and bringing said clutch spring under tension for rotating said torsion rod when the latter is released by said heat-responsive piercing tip as the latter is heated to a predetermined degree, the rotation of said torsion rod closing the switch so that current is supplied from said battery to said flasher-equipped bulb.

2. In an indicating device as per claim 1, and wherein said hollow piercing tip contains a rotary core normally held against rotation by a fusible alloy compound while the latter is in its solid state, said compound being adapted to release the core for rotation when the compound melts at a predetermined temperature.

3. In an indicating device as per claim 2, said rotary core and said torsion rod having means for interengagement with one another.

4. In a device for signalling the desired state of readiness of meat being treated, a handle, a tubular meat penetrating member extending therefrom, a substantially cylindrical holder for a piercing implement thread-connected with the free end of said member, a hollow meat piercing implement screw-attached to the holder, a torsion rod operative within said member, a rotary element extending into said piercing implement, connecting means at the latter's outer end engaging said torsion rod, a fusible compound within the meat piercing implement normally holding the interior end of said rotary element in fixed position while the compound is in its solid state, thus preventing the rotation of said torsion rod, a clutch spring frictionally engaging said torsion rod and urging its rotation in one direction, a rotary electric switch engaged by and being adapted to be rotated by said clutch spring from its normally open to its closing position when said fusible compound softens and permits the rotation of the torsion rod, spring-loaded, manually operative means for rotating said switch to its opening position while at the same time causing a forcible engagement by said clutch spring of said torsion rod, electric signalling means controlled by said switch, said fusible compound, when softened, releasing said torsion rod for rotation, thereby causing said clutch spring to close said switch and to energize said signalling means.

5. In a device for indicating the desired state of readiness of meat being treated, a meat-piercing implement having an exchangeable heat-responsive tip adapted to be lodged in the meat body subjected to treatment, a rotary member within said piercing implement connected with said tip, a clutch spring fixedly held in frictional engagement with said rotary member, a fusible compound in said tip and in engagement with said rotary member, said compound, while in its solid state, preventing movement of said rotary member and thus of said clutch spring, a rotary electric switch engaged by said clutch spring, an electrically operated signalling device controlled by said switch, said clutch spring normally keeping said switch in open position while held against movement by said rotary member, but being adapted to close said switch and thus to energize said signaling device when said fusible compound is rendered soft and permits turning of said rotary member, thus freeing the clutch spring to rotate the switch to its closing position for energizing said signalling device.

6. In a device for indicating the desired state of readiness of meat being treated, a substantially tubular meat-piercing implement, a handle for same, a spring-loaded cocking lever for the implement lodged in the handle, a rotary electric switch aligned with said implement and operative in said handle, a rotary member operative within said implement, a hollow meat-piercing exchangeable tip removably secured to and forming the piercing end of said implement, a connector for firmly holding the rotary member with and extending into said tip, a fusible compound within said tip for holding the connector, and thus the rotary member against movement when the compound is in its solid state, a clutch spring fixedly engaging said rotary member and normally keeping said electric switch in open position, a signalling device controlled by said switch and being normally de-energized while said electric switch is open, said clutch spring closing the switch to energize said signalling device, when said rotary member is freed to rotate as said fusible compound becomes soft, that is when the meat being treated attains the desired state of readiness at a desired temperature causing the softening of the compound, the spring-loaded cocking lever serving, when operated, to effect a firm frictional engagement between said rotary member and said clutch spring, thus keeping the latter in a switch-opening position until released by the softening compound.

7. A device for indicating the desired state of readiness of meat being treated, comprising in combination, a handle, a meat-piercing implement extending therefrom, an electric signalling device and an electric switch controlling the latter located in said handle, a spring-loaded rotary member within said implement and operatively engaging said switch and normally holding the latter at its open position, an exchangeable meat-piercing tip secured to the free end of the implement, a fusible compound within said tip, and means within said tip engaging said rotary member, said means held in said fusible compound against movement, while the compound is in its solid state, thus preventing the movement of the rotary member, said means causing said member to rotate to a switch closing position for energizing the signalling device when the compound softens, as the treated meat attains the desired state of readiness.

8. A device as per claim 7, and wherein said meat-piercing implement and said tip are provided with means for readily connecting and disconnecting them.

9. A device as per claim 7, and wherein said signalling device comprises an electric bulb, a flasher and an electric source of energy connected with said switch.

10. A device as per claim 7, and wherein said handle is composed of two parts, a plurality of connecting elements holding said parts against one another, one of said elements engaging said meat-piercing implement for preventing the latter's disengagement from the handle and also its rotation relative to the handle.

11. A device for indicating the desired state of readiness of meat being treated, comprising a heat-responsive meat-piercing implement adapted to be lodged into meat subject to treatment, said implement comprising a hollow meat-piercing tip filled with a normally solid heat-responsive alloy compound which is adapted to melt at a desired temperature, and a spring-loaded actuating rotary rod held in place by the solid compound, a signalling device controlled by said rod, said rod causing said signalling device to become energized when said compound softens.

12. A device of the class indicated, comprising a tubular member provided with a hollow meat-piercing tip containing a meltable alloy compound, an electric signalling device, a spring-loaded actuating rod operative in said tubular member and extending into said tip and being fixedly held by said alloy compound when the latter is in its solid state, said rod causing said signalling device to become energized when the compound melts and permits the operation of the rod.

13. In a device for indicating the desired state of readiness of meat being treated, an indicator structure comprising in combination a flasher-equipped electric bulb, a source of electric current for the bulb and a normally open switch for connecting, when closed, the source of current with the bulb, when the meat has attained the desired state of readiness, and heat-responsive means controlling the closing of said switch to energize said indicator structure, said heat responsive means, including a meat-piercing, hollow tip, a meltable alloy compound within the tip, a spring-loaded actuating member extending into the tip and held against movement within the compound, while the compound is solid, said actuating member keeping said switch in its normally open position and causing the closing of the switch when said compound melts to release said actuating member.

References Cited in the file of this patent

UNITED STATES PATENTS

| 1,443,786 | Dolph | Jan. 30, 1923 |
| 1,748,330 | Corey | Feb. 25, 1930 |
| 2,154,426 | Adams | Apr. 18, 1939 |
| 2,566,270 | Weiland | Aug. 28, 1951 |
| 2,916,915 | Burgert | Dec. 15, 1959 |